Dec. 26, 1967     A. M. STOLJAROV ETAL     3,360,298
STONE-CUTTING MACHINE WITH MOBILE CARRIAGE AND TILTABLE SAWS
Filed July 13, 1965     5 Sheets-Sheet 5

United States Patent Office 3,360,298
Patented Dec. 26, 1967

3,360,298
STONE-CUTTING MACHINE WITH MOBILE CARRIAGE AND TILTABLE SAWS
Alexei Markovich Stoljarov, Margarita Sergeevna Khorosheva, Igor Mikhailovich Matveev, and Alexandra Gavrilovna Konstantinova, Moscow, Vasily Vladimirovich Brjanov, Simferopol, and Galina Ivanovna Kovrigina, Moscow, U.S.S.R., assignors to Vsesojuzny Nauchno-Issledovatelsky Institute Novykh Stroitelnykh Materialov, Moscow, U.S.S.R.
Filed June 13, 1965, Ser. No. 471,566
4 Claims. (Cl. 299—41)

ABSTRACT OF THE DISCLOSURE

A mobile carriage is provided with transverse guides on which is mounted a mobile sawing carriage bearing a saw for horizontal cuts and two perpendicularly related vertical saws. Tilting devices are provided to tilt the sawing carriage and the saws.

The present invention relates to stone quarrying and, more particularly, to stone-cutting machines for drifting lateral and face approach and exit trenches in quarries and for extracting commercial stone in the process of drifting.

Stone-cutting machines are known for removing rectangular stone blocks and other stone pieces from continuous rock. One known stone-cutting machine comprises a frame which moves along rails and also includes an upper carriage which mounts three groups of disk saws—one for making vertical kerfs in rock perpendicular to the rails, and the other two—for simultaneous horizontal and vertical cutting parallel to the rails. This type of machine is not able to cut out wedge-shaped blocks and articles. Besides, these machines are not provided with hoisting means and mechanisms for drifting trenches in the quarry, which would make it possible to prepare exploitation areas for their operation. Therefore the drifting of lateral and face approach and exit trenches in quarries with the use of such machines is effected by means of generally adopted wedge and blasthole drilling methods.

Thus the use of the existing types of stone-cutting machines brings about an excessive waste of mineral products and an increase in the cost of extracted blocks, as well as requiring excessive manual labor.

An object of the present invention is to eliminate said disadvantages of the known stone-cutting machines and improve their general characteristics.

Said object is achieved by the persent invention due to the fact that the stone-cutting machine proposed herein has two interchangeable sawing units mounted on a sawing carriage so as to provide for their inclined setting relative to a vertical plane coinciding with the direction of travel of the machine within a range of from 0 to several degrees. Said sawing units have two output shafts each disposed at 90 degrees with respect to each other, which enables making vertical kerfs in rock for a predetermined length of blocks perpendicular to the rails along which the machine travels, or vertical and inclined kerfs for a predetermined length of blocks parallel to said rails. A third sawing unit is also provided for making horizontal kerfs and is also mounted on a sawing carriage, which may be elevated above the surface of the face bench by means of a hydraulic cylinder when making vertical kerfs perpendicular to the rails and which also enables making horizontal kerfs in the rock for a predetermined height of block on the level of the bottom of the lower rails or below the bottom level of the rails when drifting lateral and face approach and exit trenches in the quarry with the help of a conical helical cutter mounted between disk saws.

Moreover, the sawing carriage may be lifted sideways over the bench of the face by means of two hydraulic cylinders to make vertical kerfs in the rock perpendicular to the rails or track in trenches. In this event, the stationary part of the carriage is fixed by means of two sickle-shaped stops.

In order that the machine may be used both for drifting trenches while extracting wedge-shaped blocks as a by-product, and for their extraction as the main operation, the longitudinal carriage of the machine is made with detachable brackets with supporting wheels mounted therein. For mechanized removal of chippings and dust from the face, the machine is provided with a vertical elevator having a special intake device.

In accordance with the above and other of its objects, the invention comprises a new device and a combination of parts and elements thereof as described below with the understanding, however, that alterations in the exact embodiment of the invention disclosed herein may be made without departing from the spirit and scope of the invention.

Other objects and advantages of the invention will become apparent from the following description and the accompanying drawings, wherein.

Figure 1:
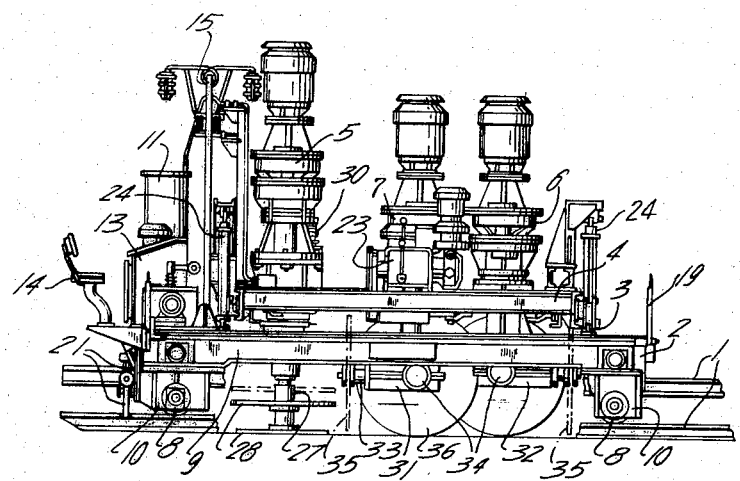
FIG. 1 is a side elevational view of the stone-cutting machine.

The stone-cutting machine (FIGS. 1–11) for removing stone blocks from, for example, mountain rock consists of a self-propelled longitudinal carriage 2 moving on rails 1 along the face and mounting guides 3 laid normal to the direction of the rails and intended for carrying across the face sawing carriage 4 with sawing units 5 for making horizontal kerfs and with sawing units 6 and 7 for making vertical kerfs, driven individually by electric motors.

Figure 3:
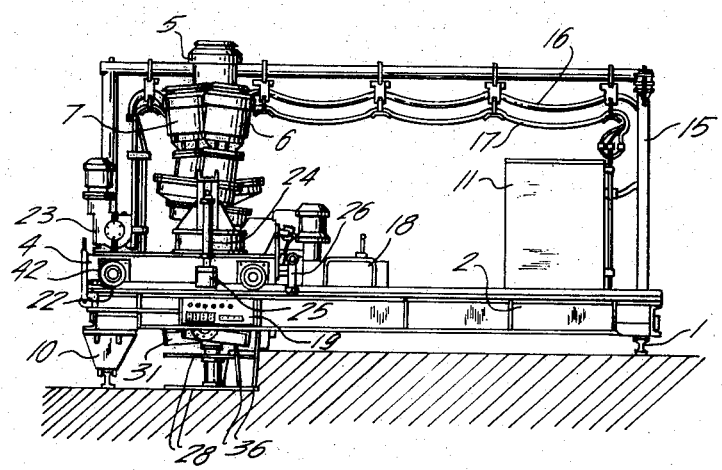
FIG. 3 is a rear view of the stone-cutting machine, when cutting out wedge-shaped blocks in the face.

Longitudinal carriage 2 has six wheels 8, four of which are mounted on cross beams 9, at the same level and two in the seats provided in detachable brackets 10. For working a pilot trench, the latter wheels are removed together with the brackets. Such an arrangement of supporting wheels on the carriage provides for setting the machine on the upper four wheels on the rails disposed in one plane on the surface of the face when drifting trenches in the quarry (FIGS. 4 and 5) and on the two lower wheels on a rail laid on the bottom of a bench when extracting stone blocks from the rock as the main operation (FIGS. 1 and 3).

Figure 2:
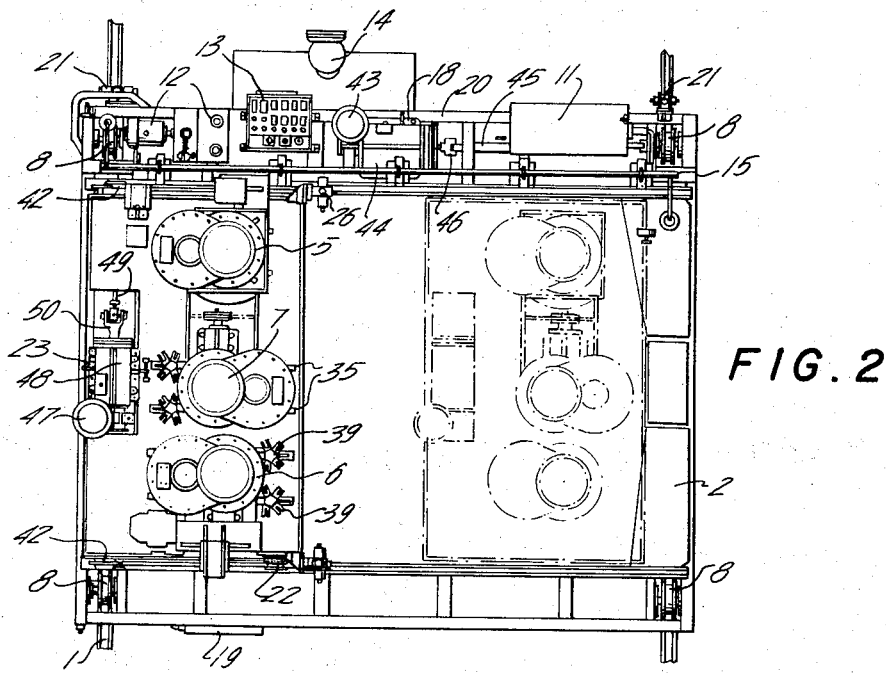
FIG. 2 is a top view of the stone-cutting machine.

The front wheels are driving ones. The driving of the front wheels of longitudinal carriage 2 is effected from a special electric motor 43 through gear box 44, transmission shafts 45 and articulated half-couplings 46 (FIG. 2). The rotation of the lower detachable front wheel from one of the axles of the upper driving wheels is effected via sprockets and a bushing-and-roller chain. Longitudinal carriage 2 also mounts electric power unit 11, pump unit 12, control desk 13, seat 14, U-shaped tubular support 15 for electric cable 16 and oil piping 17, and travel drive 18, as well as auxiliary control desk 19.

Beams 20 of longitudinal carriage 2 mount hydraulic rail grips 21, fixing the machine when making vertical kerfs parallel to the rails.

Sawing carriage 4 is a rigid platform with four driving wheels 22, travel drive 23, two hydraulic jacks 24 with wedge-type rail step bearings 25 for lifting it when making vertical kerfs perpendicular to the rails 1 in trenches, as well as with rail grips 26.

The driving front wheels of carriage 4 are driven in the same fashion as those of longitudinal carriage 2 from a special electric motor 47 through gear box 48, transmission shafts 49 and articulated half-couplings 50. The rotation of the rear wheels is effected from one of the axles of the front wheel through sprockets and a bushing-and-roller chain.

Sawing unit 5 is rigidly fixed on carriage 4. On its spindle 27, horizontal disk saws 28 or conical helical cutter 29 with said saws 28 are mounted.

Figure 6:
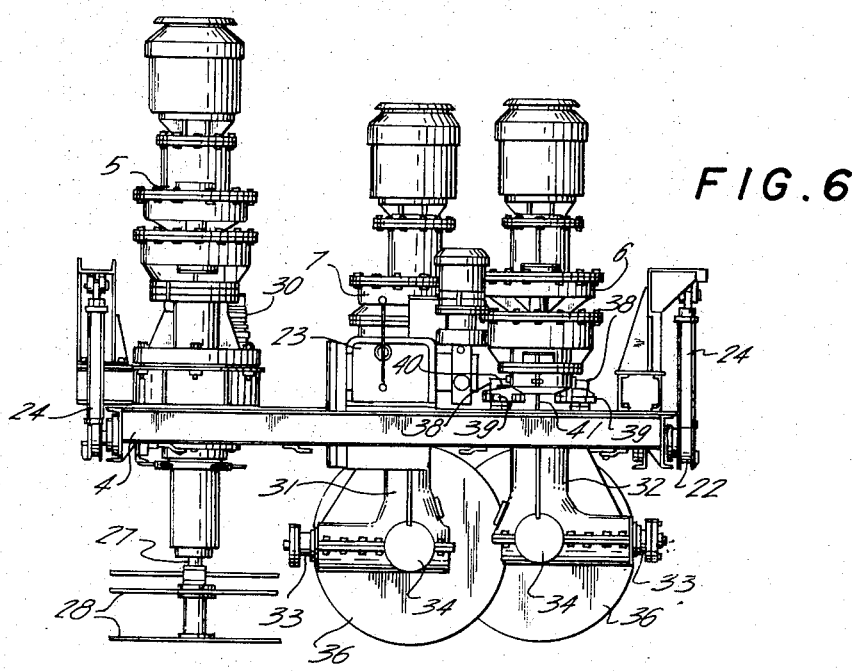
FIG. 6 is a side view of the assembled sawing carriage.

The lifting and lowering of spindle 27 is done with the aid of hydraulic cylinder 30 (FIG. 6).

Sawing units 6 and 7 are interchangeable, and are equipped with conical reduction gears 31 and 32, each having two output shafts 33 and 34 located at an angle of 90° relative to each other. Shafts 33 carry disk saws 35, intended for making vertical cuts, perpendicular to the rails, while shafts 34 carry disk saws 36 for making vertical or inclined back cuts, parallel to the rails.

Sawing units 6 and 7 thrust with their journals 37 (FIG. 7) on bearings 38 and on star-shaped turning plates 39 (FIG. 8), whose bearing protrusions are of different height and tilting angles to the horizon from 0° to several degrees, which are in accord with the adopted types and sizes of wedge-shaped stone blocks desired.

Figure 4:
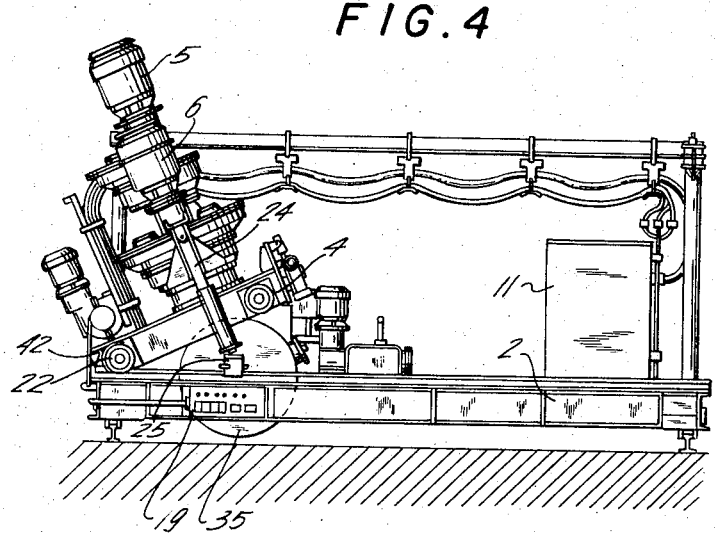
FIG. 4 is a rear view of the stone-cutting machine with the sawing carriage lifted before cutting into the rock, in the process of making vertical kerfs perpendicular to the railroad track of the machine.
Figure 5:
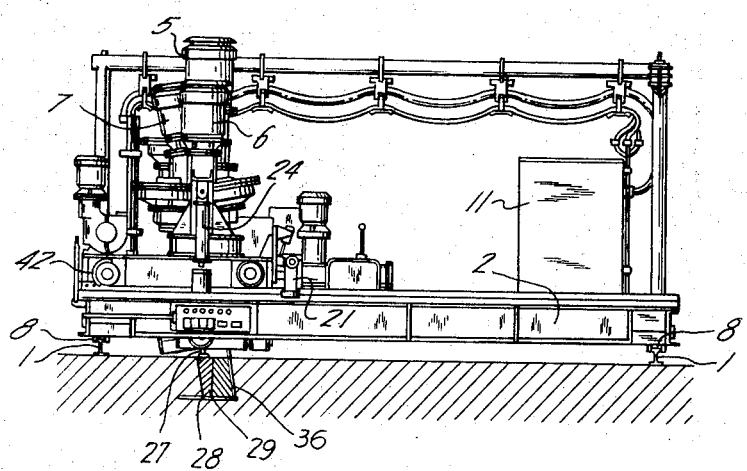
FIG. 5 is a rear view of the stone-cutting machine when making a pioneer longitudinal trench in the rock by means of horizontal saws and a conical helical cutter, as well as the vertical saw.
Figure 7:
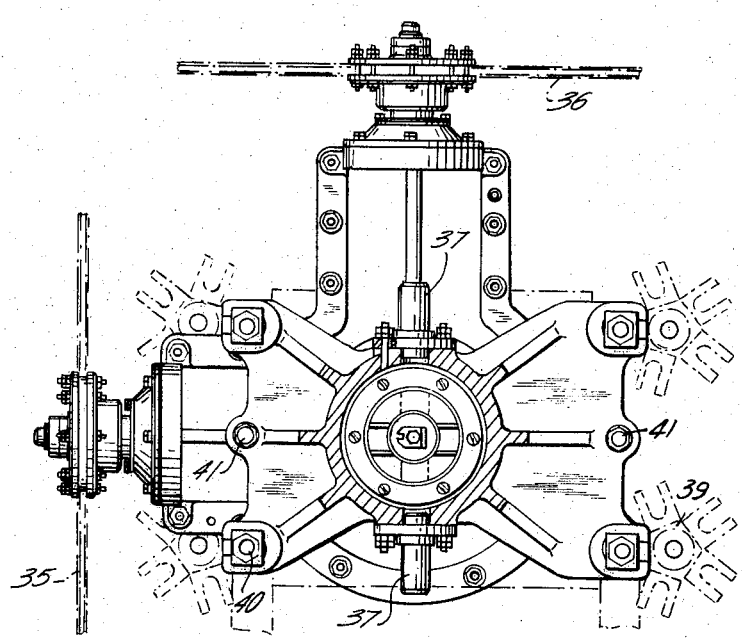
FIG. 7 is a plan view of the driving mechanism for vertical saws.
Figure 11:
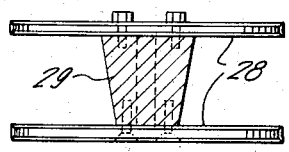
FIG. 11 shows an interchangeable working member for the sawing unit comprising horizontal saws and a conical helical cutter, intended for drifting pioneer trenches in quarries.
Figure 8:
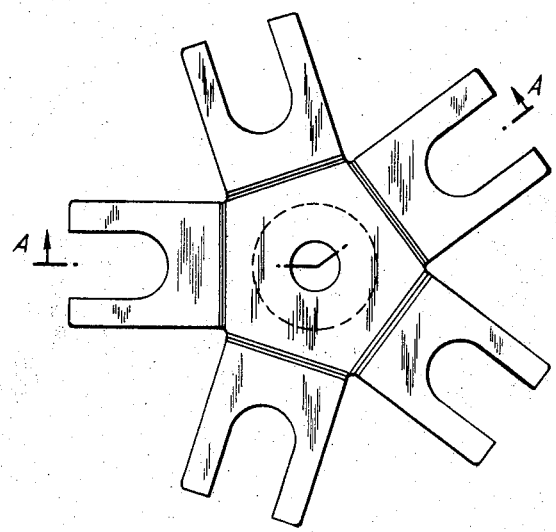
FIG. 8 is a plan view of a star-shaped turning plate.
Figure 9:
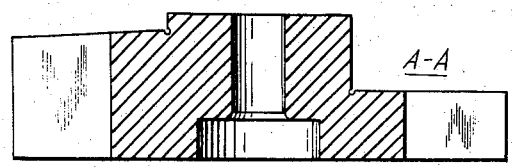
FIG. 9 is a section taken along line A—A of FIG. 8.
Figure 10:
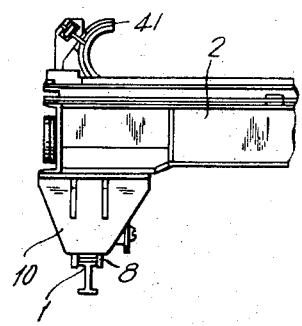
FIG. 10 is a view of the longitudinal carriage unit with a guide and a sickle-shaped stop.

By turning star-shaped plates 39, sawing units 6 and 7 are set in vertical or inclined positions for cutting out respectively rectangular or wedge-shaped blocks of required types and sizes. Sawing units 6 and 7 are attached to the frame of sawing carriage 4 by means of swivel hinge bolts 40. The incline of units 6 and 7 is varied by means of setting screws 41. Longitudinal carriage 2 is equipped with sickle-shaped stops 42 insuring its one-sided lift with the aid of jacks 24 (FIGS. 4 and 10).

In implementing the invention, it is preferable to use the stone-cutting machine with a chippings-collecting elevator mounted on longitudinal carriage 2 and equipped with a special drive and a hydraulic jack to raise it when making cross cuts or kerfs as well as with a roll table for shifting containers with chippings.

It should be noted that the present invention ensures an increase in the output of trade stone from the mountain mass due to incidental extraction of the stone from the pilot trenches.

Before starting the stone-cutting machine, a strip pit is made in the quarry having the dimensions of 3 x 3 meters and 0.5 m. deep, whence the drifting of pioneer trenches, namely the face approach and lateral ones is commenced. Then rails are provided in the direction of drifting initial trenches.

The stone-cutting machines with the removed detachable bracket is set on the rails above the strip pit. The sawing unit intended for making horizontal cuts or kerfs occupies its upper position and the saws for making vertical longitudinal cuts are removed and the saws for making vertical transversal cuts are introduced into the pit.

After that the machine starts making transverse cuts relative to the direction of the trench being drifted.

The length of the transverse cut is determined by the length of travel of the sawing carriage. When one pair of transverse cuts is completed, the sawing carriage stops and is lifted above the face. The saws are retracted from the face, the machine travels along the rails by a required distance and a next pair of transverse cuts is made.

On completion of making transverse cuts in the trench the machine returns to the strip pit and the transverse vertical saws are removed from the machine. Then the conical helical cutter with horizontal saws is mounted on the sawing units which make horizontal cuts and saws are mounted on the sawing unit which makes vertical longitudinal cuts.

The sawing unit for making horizontal cuts or kerfs by means of hydraulic jacks is brought to its lower position corrseponding to the depth of the face and a further simultaneous making of horizontal and vertical or inclined cuts is effected for cutting up the blocks from below and ultimate separation of said blocks from the rock over the entire width and length of the trench.

For making inclined longitudinal cuts in order to obtain wedge-shaped blocks, the saws for making vertical longitudinal cuts are tilted by means of hydraulic jacks.

On completion of drifting of one face approach trench, a lateral trench is drifted in a similar fashion, said lateral trench being disposed perpendicular to the first one, and a second face exit trench is disposed perpendicular to the lateral or parallel to the face approach trench. With these operations completed the exploitation area or working site in the quarry is prepared.

The extracting of stone blocks in the quarry in case of this being the main operation is done by the machine with a detachable bracket. In this case, one rail is located on the face bottom and another on the surface thereof, as shown in FIG. 3.

The work of the machine in the quarry with the extracting of stone blocks as the main operation also starts with making transverse cuts for a predetermined length of the blocks and the width of the sawing carriage travel. The excavation is effected in trenches running parallel to the pioneer lateral trench. In this case, the sawing unit for making horizontal cuts or kerfs is also in the upper position.

On completion of transverse kerfs over the entire length of the trench being drifted, the machine is returned to the initial position, that is, to the approach trench, the vertical transversal saws are removed, and the machine is adjusted, as described above, for simultaneous making of horizontal and vertical or inclined kerfs.

Commercial stone blocks are removed from the face by means of special machines.

With the extracting of stone blocks as the main operation the sawing unit for making horizontal cuts may work only with saws, without the conical helical cutter.

What is claimed is:

1. A stone-cutting machine for removing stone blocks from continuous rock, comprising a longitudinal carriage for moving along the face of the rock, a drive enabling the travel of said longitudinal carriage along the face, guides positioned on said longitudinal carriage at least substantially perpendicular to the direction of travel of said carriage, a sawing carriage travelling along said guides, a drive enabling the movement of said sawing carriage along said guides, at least one sawing unit for making horizontal cuts fixed on said sawing carriage, at least two sawing units for making vertical cuts also fixed on said sawing carriage, each including two output shafts located in a horizontal plane at an angle of 90° in relation to each other, a means for one-sided lift of said sawing carriage for an initial cutting into the rock, and means for tilting said sawing units for making vertical cuts while cutting out wedge-shaped blocks.

2. A stone-cutting machine for removing stone blocks from continuous rock, comprising a longitudinal carriage for moving along the face of the rock, a drive enabling the travel of said longitudinal carriage along the face, guides positioned on said longitudinal carriage at least substantially perpendicular to the direction of travel thereof, a sawing carriage travelling along said guides, a drive enabling the movement of said sawing carriage along said guides, at least one sawing unit for making horizontal cuts, mounted on said sawing carriage, at least two sawing units for making vertical cuts, each including two output shafts positioned in a horizontal plane at an angle of 90° in relation to each other, horizontally positioned disk saws mounted on said sawing unit for making horizontal cuts, vertically positioned disk saws mounted on the ends of the output shafts of said sawing units for making vertical cuts, means for the one-sided lifting of said sawing carriage for an initial cutting into the rock, and means for tilting said sawing units for making vertical cuts while cutting out wedge-shaped blocks.

3. A stone-cutting machine for removing stone blocks from continuous rock, comprising a longitudinal carriage for moving along the face of the rock, a drive ensuring the travel of said longitudinal carriage along the face, guides positioned on said longitudinal carriage at least substantially perpendicular to the direction of travel thereof, a sawing carriage travelling along said guides, a drive enabling the movement of said sawing carriage along said guides, at least one sawing unit for making horizontal cuts, mounted on said sawing carriage, at least two sawing units for making vertical cuts also mounted on said sawing carriage, each including two output shafts positioned in a horizontal plane at an angle of 90° in relation to each other, horizontal disk saws installed on said sawing unit for making horizontal cuts, and vertical disk saws mounted on the ends of the output shafts of said sawing units for making vertical cuts, at least two hydraulic jacks mounted on said longitudinal carriage and attached to the frame of said sawing carriage, providing for the one-sided lifting of the sawing carriage for an initial cutting into the rock, and means for tilting said sawing units for making vertical cuts while cutting out wedge-shaped blocks.

4. A stone-cutting machine for removing stone blocks from continuous rock, comprising a longitudinal carriage for moving along the face of the rock, a drive enabling the travel of said longitudinal carriage along the face, guides positioned on said longitudinal carriage at least substantially perpendicular to the direction of travel of said carriage, a sawing carriage travelling along said guides, a drive enabling the movement of said sawing carriage along said guides, at least one sawing unit for making horizontal cuts mounted on said sawing carriage, at least two sawing units for making vertical cuts also mounted on said sawing carriage, each including two output shafts positioned in a horizontal plane at an angle of 90° in relation to each other, horizontally positioned disk saws mounted on said sawing unit for making horizontal cuts and vertically positioned disk saws mounted on the ends of the output shafts of said sawing units for making vertical cuts, at least two hydraulic jacks installed on said carriage and attached to the frame of said sawing carriage, providing for the one-sided lifting of the sawing carriage for an initial cutting into the rock, star-shaped turning plates including bearing protrusions which have different height and angles of inclination to the horizon and bearing plates, the sawing units for making vertical cuts bearing on said protrusions via said bearing plates.

References Cited
UNITED STATES PATENTS

| | | | |
|---|---|---|---|
| 207,374 | 8/1878 | Webster | 299—41 |
| 896,782 | 8/1908 | Wegner et al. | 125—14 |
| 1,600,900 | 9/1926 | Marsh | 299—15 X |

FOREIGN PATENTS

| | | |
|---|---|---|
| 687,914 | 6/1964 | Canada. |
| 502,391 | 11/1954 | Italy. |

ERNEST R. PURSER, *Primary Examiner.*